(12) United States Patent
Aslaksen

(10) Patent No.: US 8,966,673 B2
(45) Date of Patent: Mar. 3, 2015

(54) INCINERATION SYSTEM AND BURNER FOR A TOILET

(75) Inventor: Odd Arne Aslaksen, Furuflaten (NO)

(73) Assignee: Sirius Technology AS, Midsund (NO)

( * ) Notice: Subject to any disclaimer, the term of this patent is extended or adjusted under 35 U.S.C. 154(b) by 977 days.

(21) Appl. No.: 12/989,456

(22) PCT Filed: Apr. 27, 2009

(86) PCT No.: PCT/NO2009/000160
§ 371 (c)(1),
(2), (4) Date: Dec. 7, 2010

(87) PCT Pub. No.: WO2009/131468
PCT Pub. Date: Oct. 29, 2009

(65) Prior Publication Data
US 2011/0119816 A1    May 26, 2011

(30) Foreign Application Priority Data
Apr. 25, 2008 (NO) .................................. 20081980

(51) Int. Cl.
A47K 11/02 (2006.01)
F23D 14/02 (2006.01)
F23D 14/82 (2006.01)

(52) U.S. Cl.
CPC .............. *A47K 11/023* (2013.01); *F23D 14/02* (2013.01); *F23D 14/82* (2013.01); *F23D 2212/201* (2013.01)
USPC ........................................................ 4/111.4

(58) Field of Classification Search
CPC .............................. A47K 11/023; C02F 11/06

USPC ............................................................ 4/111.4
See application file for complete search history.

(56) References Cited

U.S. PATENT DOCUMENTS

| | | | |
|---|---|---|---|
| 3,533,364 A | 10/1970 | Blankenship | |
| 3,855,645 A | 12/1974 | West, Jr. | |
| 3,858,251 A | 1/1975 | Vollrath et al. | |
| 2,439,467 A | 2/1975 | Helke | |
| 4,122,557 A | 10/1978 | Harris | |
| 4,752,213 A | 6/1988 | Grochowski et al. | |
| 2007/0048685 A1 | 3/2007 | Kuenzler et al. | |

FOREIGN PATENT DOCUMENTS

| | | |
|---|---|---|
| DE | 2439467 A | 2/1975 |
| DE | 202004006644 U | 8/2004 |
| EP | 0223691 A | 5/1987 |
| EP | 0378272 A | 7/1990 |
| EP | 0982541 A | 3/2000 |

*Primary Examiner* — Tuan N Nguyen
(74) *Attorney, Agent, or Firm* — Frommer Lawrence & Haug LLP; Ronald R. Santucci

(57) ABSTRACT

A gas powered incineration toilet is disclosed with a burner of the premixed full air type. The burner (9) includes an outer air chamber (20) which is closed at a first end and has a first exit for combustion air at a second end and which is connected with a channel (17) for supply of air, an inner gas mixing chamber (21) of smaller diameter than the outer chamber (20), which has at least one opening (22) proximate a first end for supply of air and a second exit for combustion gases at a second end, as well as a nozzle (16) for supply of air, as there is provided at least one backfire prevention system (23, 24, 25) in the form of a perforated plate and/or screen at the second combustion gas exit.

6 Claims, 3 Drawing Sheets

INCINERATION SYSTEM AND BURNER FOR A TOILET

This application is a 371 of PCT/NO2009/000160 filed on Apr. 27, 2009, published on Oct. 29, 2009 under publication number WO 2009/131468 A which claims priority benefits from Norwegian Patent Application No. 2008 1980 filed Apr. 25, 2008, the disclosure of which is incorporated herein by reference.

FIELD OF THE INVENTION

The present invention relates to a so-called incineration toilet, in which faeces are incinerated by supplied heat.

BACKGROUND

Incineration toilets are in particular used where a public sewer system is not available, or in buildings of a temporary character, such as cabins and workers barracks. Heat for the incineration is either provided by electricity or from a gas burner.

From Norwegian patent NO 321,144 is known an electric toilet of the above-mentioned type. Paper bags must be used. Afterwards, the paper bags fall down into an incineration chamber. An electric heating element in the upper part of the incineration chamber incinerates the waste by a combination of irradiation and convection. Odours are removed from the exhaust gas with a platinum catalyst, the exhaust gas being removed through a venturi system, and further out above the roof in a plastic exhaust tube. A fan establishes a lowered pressure in the toilet, so the toilet room remains free of odours. A proven system, but one which is dependent on access to the electric mains.

From SE 528,821 is known a corresponding system with a gas burner, and which is meant to be used in locations with no mains access. The toilet only requires electric power for fans and control system. This may be provided as 12 VDC from solar panels or similar, and propane gas from a common portable gas flask. The toilet is designed from a common electric toilet in which the electric heating element and other mains driven equipment has been removed and replaced by a gas burner.

SUMMARY OF THE INVENTION

According to the present invention there is provided an improved incineration system for a gas powered incineration toilet, with stable incineration and increased security against extinguishing the fire and gas leakage, independent of normal variations in barometric pressure and draught conditions and the pressure of the delivered gas.

This is achieved in an incineration system as defined in the appended claims.

In particular, according to claim 1 there is provided an incineration system with a burner including an outer chamber which is closed at a first end and has a first combustion exit at the other end and is connected to a channel for supplying air, an inner chamber of smaller diameter than the outer chamber, which has at least one opening proximate to a first end for supplying air and a second combustion gas exit at the other end, as well as a nozzle for supplying gas, at least one check barrier in the form of a perforated plate and/or screen being provided at the second combustion gas exit.

The incineration system also includes a fire spreader in the form of a half moon shaped tube with downward pointing openings. The fire spreader is mounted in an incineration chamber and connected with the second combustion gas exit.

BRIEF DESCRIPTION OF THE DRAWINGS

The advantages and properties of the present invention will appear clearer by studying the appended drawings, in which.

DETAILED DESCRIPTION

Figure 1:
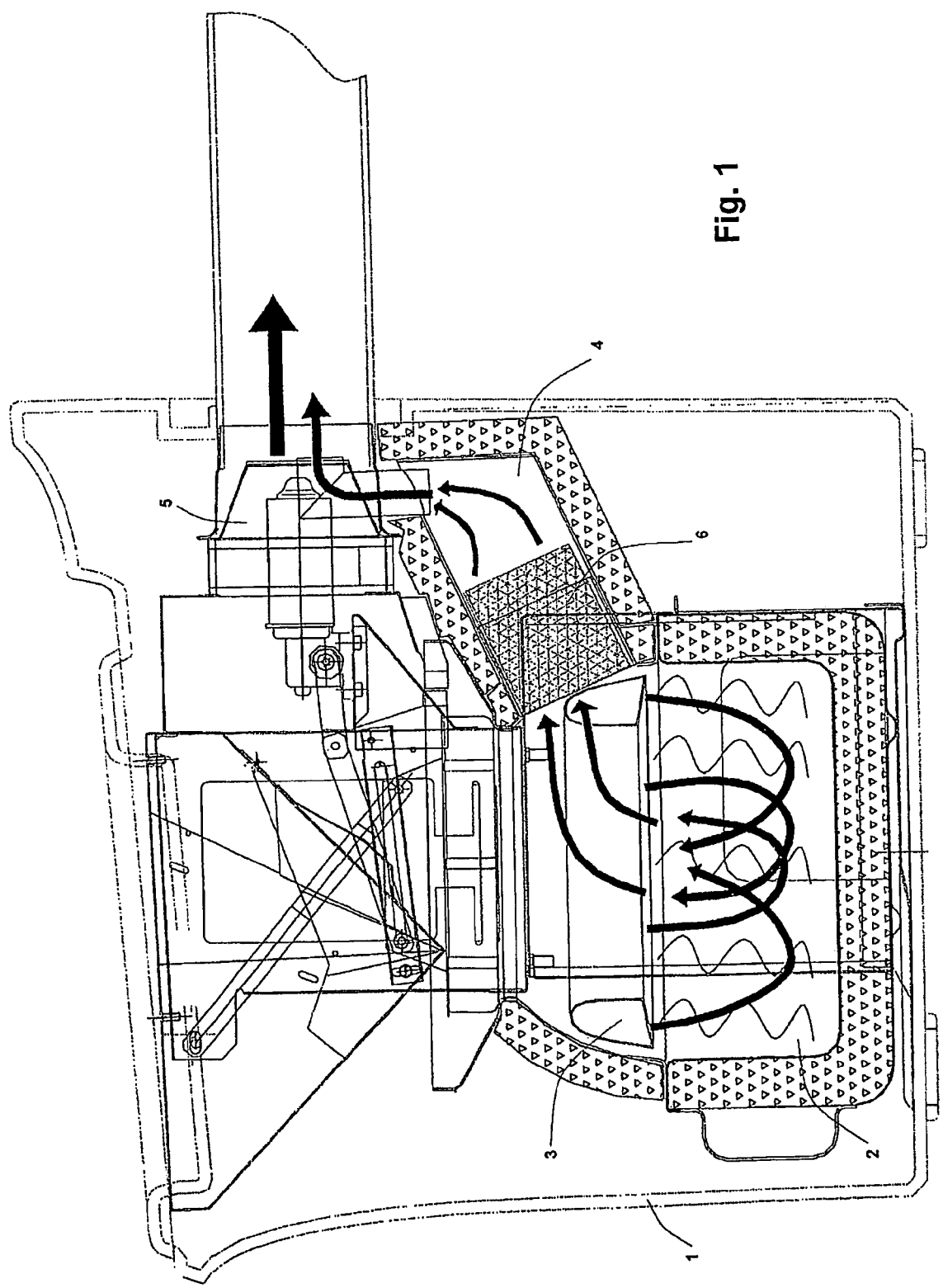
FIG. 1 is a schematic drawing showing a section through an incineration toilet according to the present invention.

FIG. 1 shows a section through a toilet according to the present invention including a toilet seat 1 with an incineration chamber 2 for the incineration of faeces. The incineration chamber 2 has insulated walls and includes a fire spreader 2 that is heated by burning combustion gas from a gas burner. The exhaust gases are evacuated by an evacuation fan 5 through a channel 4. In the channel there is located a catalyst 6.

Figure 2:
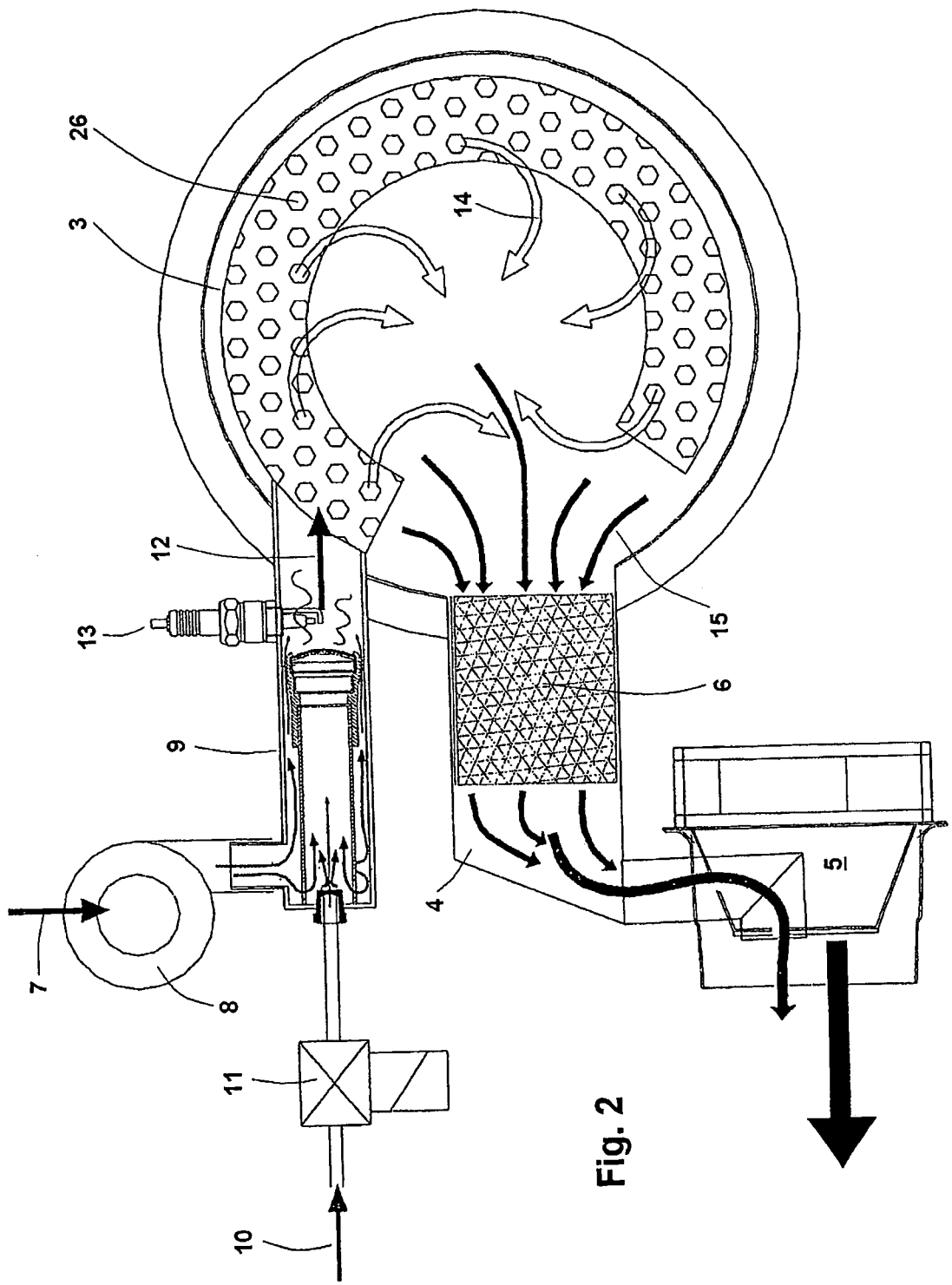
FIG. 2 shows the components of the incineration system in the toilet.
Figure 3:
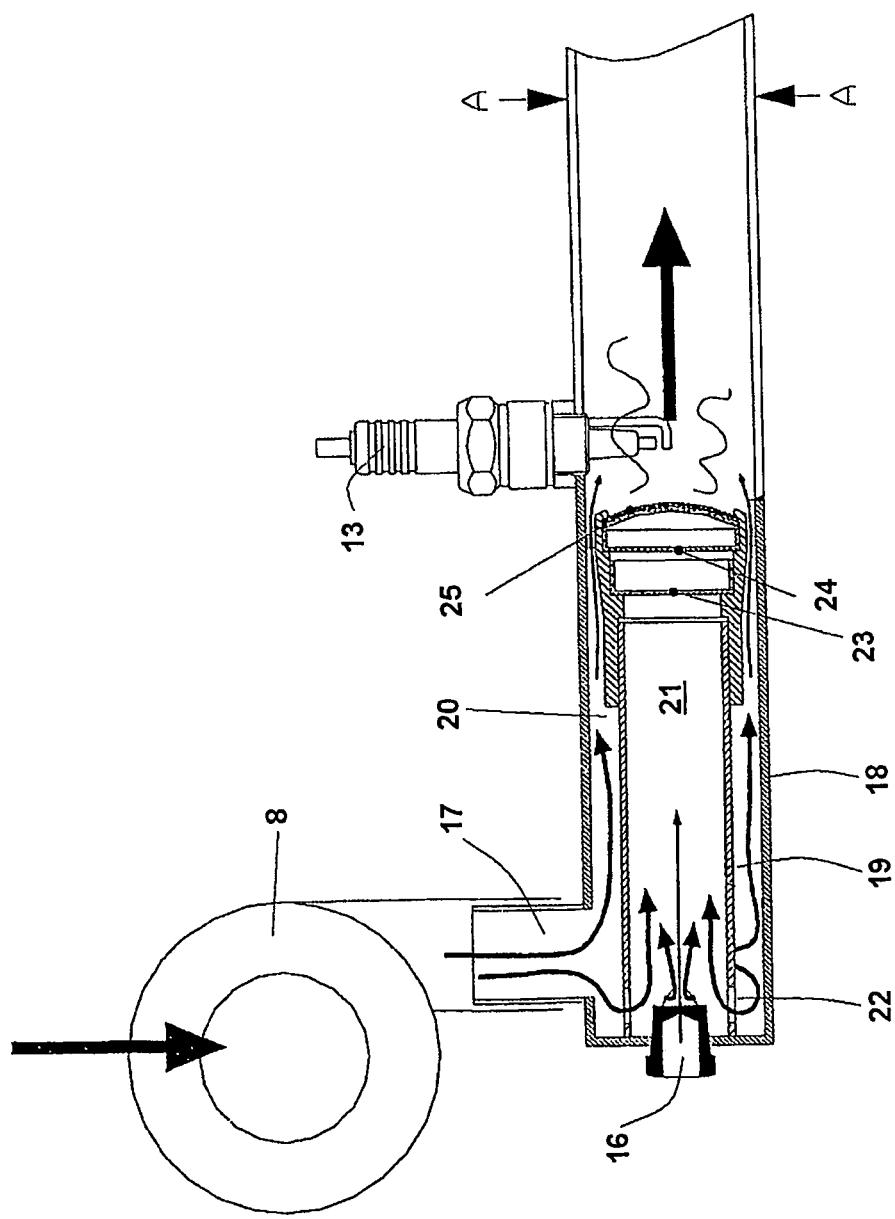
FIG. 3 is a section through the gas burner.

The main components of the incineration system, including burner, incineration chamber and exhaust system, are illustrated in FIG. 2, while FIG. 3 shows details of the burner itself.

In the incineration system illustrated in FIG. 2, air is supplied from outside (illustrated by arrow 7) via a supply fan 8 to a burner 9 wherein the air is mixed with gas. The gas, illustrated by arrow 10, may be delivered from a bottle. The gas supply is controlled by a solenoid valve 11. Outside the burner 9, in the channel 12, the gas/air mixture is ignited by an ignition plug 13. The burning gas is led to the fire spreader 3 (here, the fire spreader is shown from below). The gas is led further into the incineration chamber 2, indicated by arrows 14. The exhaust gas 15 is led out of the incineration chamber 2 through the catalyst 6, channel 4 and exhaust fan 5.

The burner 9 is of the type called a premix full air burner, in which gas and air is mixed just before the combustion zone. This happens in the back part of the burner head, where gas is supplied through a calibrated nozzle 16. Combustion air is supplied from the fan 8 via a channel 17. The fan 8 is necessary in order to provide a stable air supply, as the pressure conditions in the toilet may be very variable, and otherwise would disturb the burner 7.

The burner consists of two concentric channels 18, 19, e.g. two tubes forming two chambers, a first outer air chamber 20 in the annulus between the channels 18, 19, and a second inner gas mixing chamber 21 inside the inner channel 19. The air supply channel 17 opens out in the outer chamber 20. In the inner chamber 21 there are a number of openings 22 in the rear part towards the nozzle 16. The openings 22 admit a share of the combustion air from the outer chamber 20. Gas and air is mixed in the inner chamber 21 before the mixture is led further to be ignited.

The gas is ignited by a spark from a spark plug 13 located in the tube 12 in front of the burner head. This plug 13 also acts as a sensor for an ionizing fire guard. Optionally, an ignition (glow) plug or other suitable device may be used to ignite the gas.

Before the premixed gas is led to the spark plug 13, it must pass through a backfire prevention system including two perforated plates 23, 24 and a particular screen 25 made of knitted metal fibre. The combustion occurs out through this screen 25. The major pressure drop is through the screen 25 causing the fire to be stabilized and burn without noise and backfires.

Air and gas is mixed in two stages. In stage 1, which is described above, about 70% of the air demand is supplied.

In stage 2 secondary air is supplied directly to the fire. This air is conducted via the outer chamber 20 between the inner 19 and the outer channel 18, and out through openings at the periphery around the burner screen 25 itself. The sum of primary and secondary air should provide an excess air of about 10-15%.

By sharing the air supply in this way the following advantages are obtained:
- A more saturated mixture is obtained at the core of the flame resulting in a lower combustion temperature
- This should theoretically provide a cleaner exhaust gas, as less nitrogen dioxides are formed at lower temperatures
- The secondary air cools the outer tube reducing the heat load on the spark plug
- A lower total pressure drop over the burner puts less load on the combustion air fan
- The burner may handle larger cyclic variations in air and gas pressure From the burner head 9 the hot gas is conducted into the toilet's incineration chamber 2 via a fire spreader 3 in the form of a half moon shaped tube. The gas escapes through openings 26 in this tube (FIG. 2). The openings 26 are directed downwards, causing the gas to blow down against the waste. This tube becomes red hot, and also provides heat transfer through radiation. The burner works with air excess, which means that the hot gas contains enough oxygen to incinerate the waste. This combination of irradiation and blowing has proven to provide a very effective cremation consuming a minimum of gas.

Exhaust gases and evacuation: As the exhaust from the burner 9 is mixed with the exhaust gases from the waste, the amount of exhaust through the catalyst 6 is approximately doubled compared with an ordinary electrical toilet. To prevent overpressure from forming in the incineration chamber 2, with subsequent ejection of ill-smelling gases, it is necessary to make the evacuation system of adequate dimensions. The toilet in FIG. 1 is based on a fan/venturi system. A system based on a high pressure fan and the ejector principle has also been tried out, and works satisfactorily.

Burner control: The burner 9 is controlled from a control unit (not shown), together with a combined ignition unit/fire guard. This ignition unit ignites and extinguishes the fire on signal from the control unit, and opens and closes the gas supply via a solenoid valve 9. In addition to igniting the fire, the ignition unit acts as a fire guard by sensing the ionising in the fire. Should the fire extinguish, the ignition unit will record this and cut the gas supply after 7 seconds. This prevents dangerous amounts of gas from flowing into the toilet (no fire-no gas).

The temperature in the incineration chamber 2 is surveyed by a thermo element. The burner 9 is kept ignited until a maximum temperature of 540 degrees centigrade is reached. Then, the temperature is kept at this level in a certain period controlled by the program in the control unit. In this period the burner 9 is extinguished and ignited intermittently causing the temperature to cycle around a mean temperature of about 520 degrees centigrade. When the program time has expired, the burner 7 is extinguished. Only the exhaust fan 5 continues to run until the toilet is cooled.

The invention claimed is:

1. An incineration system for a toilet including a gas burner, an incineration chamber and an evacuation fan, wherein the burner including an outer air chamber which is closed at a first end and has a first exit for combustion air at a second end and which is connected with a channel for supply of air, an inner gas mixing chamber of smaller diameter than the outer chamber, that has at least one opening proximate to a first end for supply of air and a second exit for combustion gases at a second end, as well as a nozzle for supply of gas, a perforated plate and/or screen at the second combustion gas exit, and a spark plug located outside the second end of the inner chamber.

2. An incineration system as claimed in claim 1, further including a fire spreader in the form of a half moon shaped tube with downward pointing openings, the fire spreader being mounted in the incineration chamber and connected to the second combustion gas exit.

3. An incineration system as claimed in claim 1, including first and second check barriers in the form of perforated plates and a third check barrier made of a knitted metal screen.

4. An incineration system as claimed in claim 1, in which the spark plug is adapted to ignite the mixture of air and gas.

5. An incineration system as claimed in claim 1, further including a supply fan delivering air to the outer chamber.

6. A burner for a toilet, wherein an outer air chamber which is closed at a first end and has a first exit for combustion air at a second end and which is connected to a channel for supply of air, an inner gas mixing chamber of smaller diameter than the outer chamber, which has at least one opening proximate a first end for supply of gas and a second exit for combustion gases at a second end, and a nozzle for supply of gas, a backfire prevention system in the form of a perforated plate and/or screen being provided near the second combustion gas exit, and a spark plug located outside the second end of the inner chamber.

* * * * *